United States Patent [19]

Angenent et al.

[11] Patent Number: 5,022,733
[45] Date of Patent: Jun. 11, 1991

[54] LOW-REFLECTION BALL LENS CONNECTOR PART

[75] Inventors: Johannes H. Angenent; Giok D. Khoe, both of Eindhoven, Netherlands; Gathal J. Mahon, Glostrup, Denmark; Abram Van De Grijp, Eindhoven, Netherlands; Cornelis J. T. Potters, Eindhoven, Netherlands; Kieran G. Wright, Eindhoven, Netherlands

[73] Assignee: U.S. Philips Corporation, New York, N.Y.

[21] Appl. No.: 397,057

[22] Filed: Aug. 22, 1989

[30] Foreign Application Priority Data

Aug. 25, 1988 [NL] Netherlands ............... 8802094
Jul. 14, 1989 [NL] Netherlands ............... 8901821

[51] Int. Cl.⁵ .................................. G02B 6/32
[52] U.S. Cl. ........................ 350/96.18; 350/96.20
[58] Field of Search ............ 350/96.18, 96.20, 96.21, 350/96.22

[56] References Cited

U.S. PATENT DOCUMENTS

| 4,289,374 | 9/1981 | Franken | 350/96.20 |
| 4,290,667 | 9/1981 | Chown | 350/96.18 |
| 4,759,601 | 7/1988 | Knutsen et al. | 350/96.18 |
| 4,781,431 | 11/1988 | Wesson et al. | 350/96.21 |

FOREIGN PATENT DOCUMENTS

| 207552 | 1/1987 | European Pat. Off. | 350/96.18 |
| 2437637 | 4/1980 | France | 350/96.18 |
| 62-235909 | 10/1987 | Japan | |

OTHER PUBLICATIONS

R. S. Vodhanel, ". . . Frequency Shifts in Single Mode Laser Diodes Coupled to Optical Fibers", Electronic Letters, vol. 20, pp. 973–974.

*Primary Examiner*—William L. Sikes
*Assistant Examiner*—Phan T. Heartney
*Attorney, Agent, or Firm*—Ernestine C. Bartlett

[57] ABSTRACT

A ball lens connector part having low total reflections as well as a method of manufacturing such a ball lens connector part are described. The total reflections can be limited to less than −60 dB by means of the present ball lens connector part. The ball lens connector part comprises a fiber with an inclined fiber end in a tubular housing which housing further comprises a ball lens. If the ball lens comprises a flat surface, the total reflections can be lower than −80 dB. By subjecting the end of the housing to a machining treatment, the center line of the said end is moved in such a manner that it coincides with the optical axis of the emanating light beam.

10 Claims, 2 Drawing Sheets

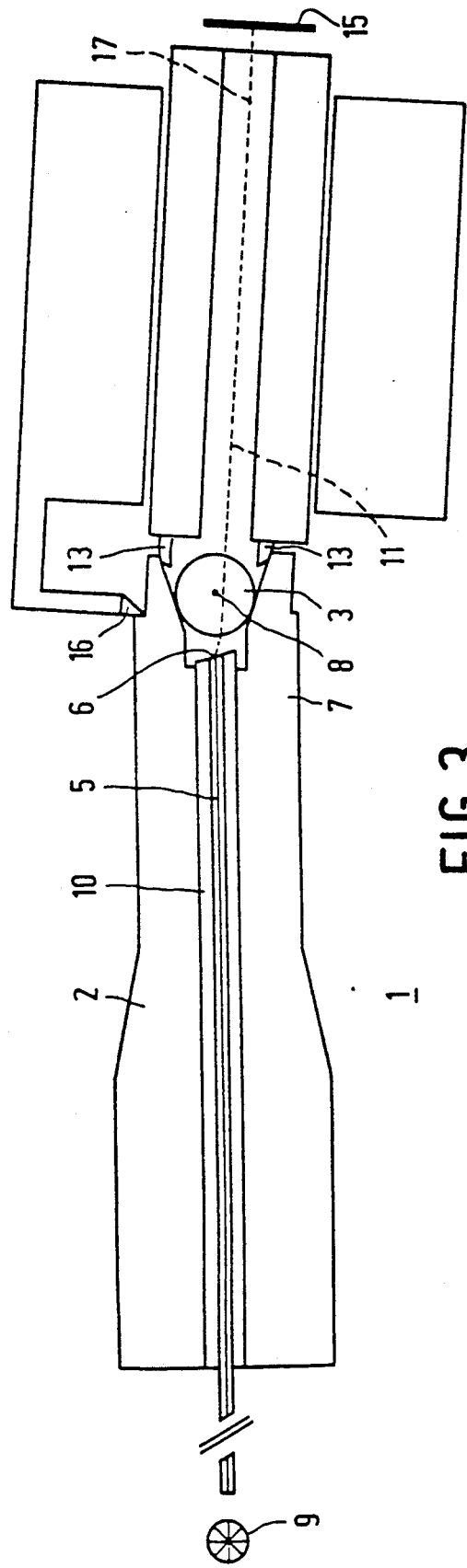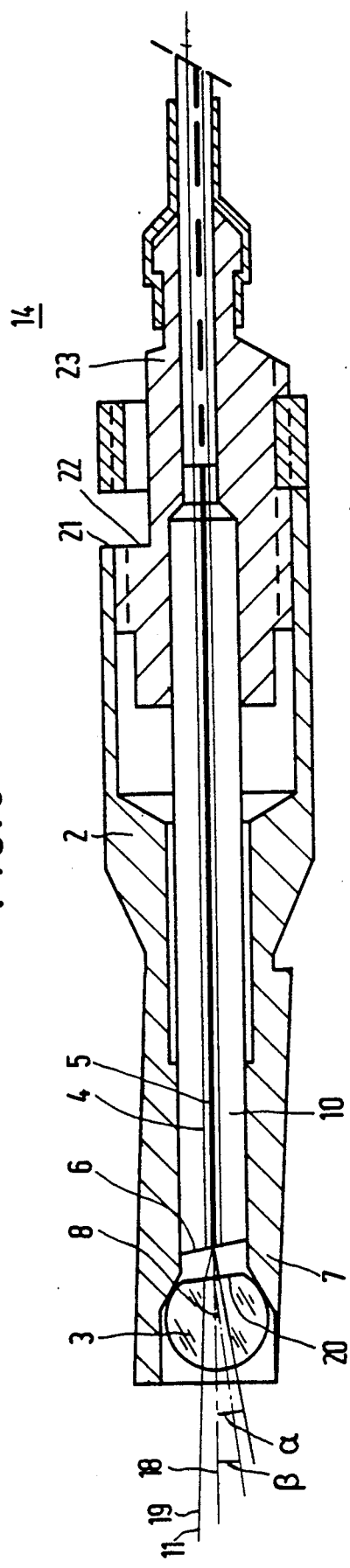

LOW-REFLECTION BALL LENS CONNECTOR PART

FIELD OF THE INVENTION

The invention relates to a ball lens connector part for use in an optical connector, which ball lens connector part comprises a tubular housing, a ball lens provided in one end of the housing and an end part of an optical fiber having a light-conductive core secured in the housing, the center of the end face of the fiber core accommodated in the housing being situated substantially in the focal plane of the ball lens, the center line of the circumference of the tubular housing at the area of the end coinciding with the optical axis of the connector part, the said optical axis being defined as the center line of the parallel light beam emanating via the ball lens when the connector is used, the center of the ball lens being situated on the elongation of the center line of the fiber core. The invention also relates to a method of manufacturing such a ball lens connector part. Ball lens connectors are used in those cases in which fast and efficient detachable coupling of optical light conductors and/or optical elements is of importance, for example, in telecommunication apparatus.

BACKGROUND OF THE INVENTION

A ball lens connector part of the kind mentioned above is known from European Patent Application No. 207,552. An optical fiber the core of which coincides substantially with the center line of the circumference of the tubular housing is connected in the tubular housing of the connector part described in the said Application. The end face of the end part of the fiber clamped in the housing extends perpendicularly to the fiber core, i.e. the normal of the said end face and the center line of the fiber core extend in parallel and hence enclose a mutual angle of 0°.

It has been found that the total reflection of light radiated in the fiber is still considerable in the known ball lens connector part. These total reflections are composed of reflections of light on the end of the optical fiber which is present just in front of the ball lens (end face reflections) and of reflections on the ball lens (ball lens reflections). The reflected light radiates via the fiber core in the direction of the light source used. In the case in which the light source used is a laser, the said reflections may give rise to undesired floatings in the frequency, phase and/or amplitude of the radiated laser light. In spite of the use of antireflex coatings known per se on the ball lens, as a result of which the ball lens reflections are reduced, it has been found that the total reflections in the known ball lens connector part are still unacceptably high.

SUMMARY OF THE INVENTION

An object of the present invention is to provide a ball lens connector part of low reflection. Another object of the invention is to provide a ball lens connector part in which the total reflections are smaller than −60 dB, and preferably smaller than −80 dB.

These and other objects are achieved by means of a ball lens connector part of the type mentioned in the opening paragraph which is further characterized in that the smallest angle which is formed by the normal of the end face of the fiber core and the center line of the fiber core at the area of the end part of the fiber is not equal to 0° and in that the end of the housing is machined so that the center line of the circumference of the end and the optical axis coincide. Since the center line of the fiber core is no longer at right angles to the end face of the optical fiber, the light reflected on this end face is no longer radiated entirely via the fiber core in the direction of the light source. Depending on the value of the angle between the normal of the end face of the fiber core and the center line of the fiber core, the reflected light is radiated to a greater or smaller extent into the fiber, coating.

In a preferred embodiment of the ball lens connector part according to the invention, the smallest angle which is formed by the normal of the end face of the fiber core and the center line of the fiber core at the area of the end part of the fiber is between 7° and 12°. Calculations and measurements have demonstrated that, if a conventional monomode glass fiber is used and if the ball lens comprises a conventional antireflex coating, the total reflections in a ball lens connector part in which the said angle is at least 7°, are smaller than −60 dB. This is a generally accepted maximum limit value for reflections in optical components such as ball lens correctors coupled to lasers. When the said angle exceeds 12°, the end face reflections increase again by the occurrence of reflections of a different kind.

It is to be noted that the use of an optical fiber having an inclined end face with the object of reducing the end face reflections is known per se from inter alia Electr.-Letters 20, 973–974 (1984). In this case, however, the light emanating from the inclined end of the fiber is collimated manually by means of a lens which can be controlled, for example, by an x-y manipulator. However, such constructions are not suitable for application in couplings in which it must be possible to interrupt and produce couplings in an efficient and rapid manner.

It is further to be noted that the direct use of an optical fiber having an inclined end in the tubular housing comprising a ball lens known from EP-A-207,552 referred to above presents disadvantages. In the ideal case in which the axes of the fiber core and the housing coincide, the optical axis of the emanating light beam in such a construction extends substantially parallel to the axis of the circumference of the tubular housing; however the two last-mentioned axes do not coincide so that in this manner a ball lens connector part having a unacceptably low coupling efficiency is obtained. Since the emanating light beam does not pass through the center of the ball lens, the angle correction indicated in the said EPA No. 207,552 Patent Specification cannot be used successfully. As a result, the low-reflection ball lens connector parts having an inclined fibre end have not been used to date. This disadvantage has been overcome in the ball lens connector part according to the present invention.

In another preferred embodiment of the ball lens connector part according to the invention, a ball lens is used having a refractive index that is greater than 1.6. It has been found that the coupling losses as a result of lens aberrations in a connector consisting of two of these ball lens connector parts are very low if ball lenses are used having a high refractive index, i.e. a refractive index exceeding 1.6.

In still another preferred embodiment of the ball lens connector part according to the invention, the ball lens has a flat surface on its side facing the end part of the fiber. By using a ball lens having a flat surface, the ball lens reflections mentioned hereinbefore are considerably reduced. As a result the total relections are also reduced. For such a ball lens connector part, preferably, the normal on the flat surface of the ball lens and the center line of the fiber core are at an angle which is between 4° and 10°. With these ball lens connector parts total reflections which are smaller than −80 may be achieved. Such a low value is sufficiently low for use in combination with any laser known to date. Between the value of 4° and 10° of the angle between the normal on the flat surface of the ball lens and the center line of the fibre core (angle $\beta$), the contribution of the ball lens reflections to the value of the total reflections is minimum. If $\beta$ is smaller than 4°, then the ball lens reflection reduction is still rather low. When $\beta$ is larger than 12°, technical problems occur. In that case the ball lens must be ground off too far in order to obtain a sufficiently large flat surface in the ball lens for the light beam to be incident on.

In yet a further preferred embodiment of the ball lens connector part according to the invention, the end part of the optical fiber is secured in a tube having a capillary concentric bore, the tube being connected in the housing.

A method of manufacturing the ball lens connector part according to the invention comprises the steps wherein an end part of an optical fiber is provided with an inclined end face, after which the said end part is secured in a tubular housing which comprises a ball lens and the ball lens connector part thus formed is positioned against an eccentric seat of a machining tool, the positioning of the connector part and the eccentricity of the seat being so selected that the optical axis of the connector part coincides with the mechanical axis of the tool, after which the connector part is subjected to a machining treatment.

Preferably, prior to the inclination, the end part of the optical fibre is secured in a capillary which is provided with a reference surface indicating the direction in which the end face is inclined. Such a reference surface facilitates the correct positioning of the ball lens connector part against the seat of the machining tool.

BRIEF DESCRIPTION OF THE DRAWINGS

Embodiments of the invention will now be described in greater detail with reference to the accompanying drawing, in which

FIG. 3 is a longitudinal sectional view of a part of a ball lens connector part according to the invention during the machining and;

FIG. 4 is a longitudinal sectional view of another ball lens connector part according to the invention.

It is to be noted that for clarity the various components and angles are not drawn to scale in the FIGS.

DETAILED DESCRIPTION OF PREFERRED EMBODIMENTS

Figure 1:
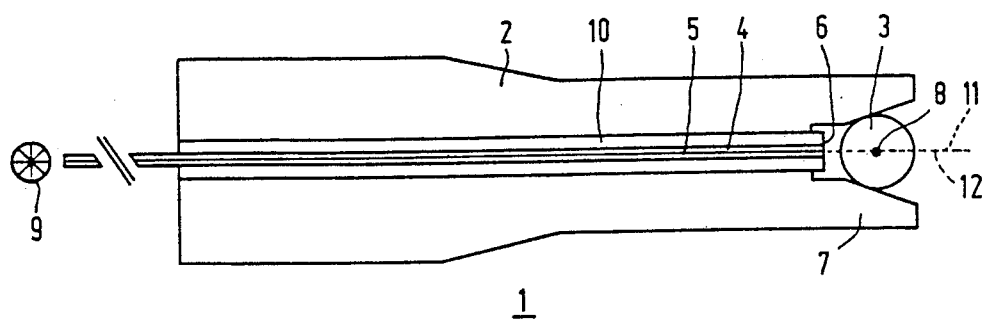
FIG. 1 is a longitudinal sectional view of the known ball lens connector part which comprises an optical fiber having a straight end face.

The known ball lens connector part 1 shown in FIG. 1 comprises a tubular housing 2, a ball lens 3 and an optical fiber 4 having a light-conducting core 5 situated concentrically in the said fiber, the end face 6 being at right angles to the axis of the optical fiber. The optical fiber 4 is secured in a glass tube 10 having a concentric capillary bore. The light-conducting core 5 of the optical fiber 4 coincides with the axis of the circumference of the tubular housing at least at the area of the end 7. The center 8 of the ball lens is situated at the elongation of the said axis. When light from a light source 9 (for example, a laser) is introduced into the optical fiber 4, the light beam emanating from the end face 6 will be in the elongation of the fiber core 4. The center line of the said emanating light beam is defined as the optical axis 11 of the light beam. This optical axis passes through the center 8 of the ball lens 3 and coincides with the center line 12 of the end 7 of the tubular housing 2.

An noted before, it is not possible as such to use an optical fiber having an inclined end face in the known tubular housing comprising a ball lens. If an optical fiber having an inclined end face is secured in the tubular housing, the optical axis of the light beam emanating from the end face of the fiber does not coincide with the axis of the circumference of the end of the connector. In that case the light beam when emanating from the optical fiber is diffracted at the area of the inclined end face, so that the said light beam does not pass through the center of the ball lens. The optical axis of the emanating light beam is hence shifted over a given distance with respect to the center line of the circumference of the tubular housing, so that the two axes in the ideal case extend in parallel. The amount of the shift depends on the extent to which the end face is inclined. It will be obvious that the coupling efficiency of a ball lens connector in which the said ball lens connector part is used, will be small.

Figure 2:
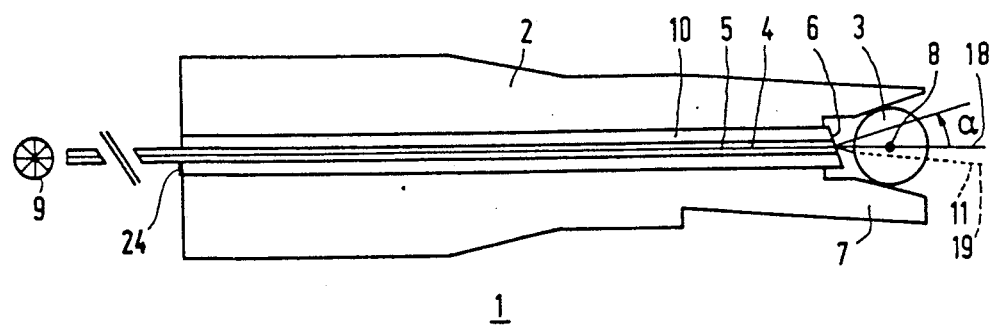
FIG. 2 is a longitudinal sectional view of a ball lens connector part according to the invention.

FIG. 2 shows a ball lens connector part according to the invention, in which the fiber comprises an inclined end face and the problem mentioned hereinbefore has been overcome. In the tubular housing 2 an optical fiber 4, having an inclined end face 6 the normal of which enclosed an angle $\alpha$ with the center line 18 of the core 5 of the optical fiber, is secured in capillary 10. The direction in which the end face is inclined is marked on the capillary by means of a reference surface 24. In this connector part the end 7 of the tubular housing 2 is machined so that the optical axis of the light beam 11 emanating from the connector part coincides with the axis 19 of the circumference of the end 7. The machining may be carried out by means of an adapted machining tool as described in EP 207,552. Because the optical axis of the emanating light beam does not pass through the center 8 of the ball lens 3, the seat 13 of the machining tool 14 which in the alignment is placed against the ball lens or—as is shown in FIG. 3—against the end 7, must be situated asymmetrically with respect to the mechanical axis 17 of the tool, so that the emanating light beam 11 coincides with the said mechanical axis 17. The coincidence of the light beam 11 with the mechanical axis 17 can be determined, for example, by means of light detector 15. This situation is shown in FIG. 3. The correct arrangement of the connector part against the eccentric seat 13 can be determined from the marking on the capillary. The eccentricity of the seat 13 with respect to the mechanical axis can be calculated from the dimension of the ball lens, the refractive index of the optical fiber and the ball lens and from the extent of inclination of the fiber end. With an inclination of 10° of the optical fiber (angle $\alpha$) and a ball lens of 3 mm cross-section of BK7 material said eccentricity is approximately 200 $\mu$m. After the machining operation with, for example, a rotating cutter 16 a low-reflection ball lens connector part is obtained in which an emanating light beam coincides with the center line of the end.

In this manner both the angle correction as described in EP 207,552 and the correction of the shift of the light beam as a result of the inclination of the fiber end can be realized in a single operation.

The table shows a few calculated and measured reflection values of a ball lens connector part according to the invention described in the preceding paragraph as a function of the inclination (angle α) of the fiber end. A low-reflection ball lens connector may be constructed from two of the ball lens connector parts according to the invention which are positioned in a V-groove with respect to each other.

| angle | reflection value (dB) | |
|-------|-----------------------|---|
|       | calculated | measured |
| 0°    | −14        | −14      |
| 6°    | −52        | −53      |
| 10°   | −120       | <−60     |

FIG. 4 shows another ball lens connector part according to the invention. In this connector part the clamped fiber 10 has an inclined end face 6 of 10° (angle α), and the ball lens comprises a flat surface 20. In FIGS. 2 and 4 the same components of the connector part are referred to by the same reference numerals as much as possible. The angle between the normal on the surface of the ball lens and the center line of the fiber core 18 passing through the center of the ball lens (angle β) in this case is 5°. With this ball lens connector part the measured reflections are smaller than −90 dB.

The connector part shown in FIG. 4 is manufactured as follows. A ball lens having a refractive index of 1.81 (LaSF9-ball lens, Scott) was ground until a flat surface having the desired size had been obtained, and was then polished. The ball lens was placed with its flat surface on a reference surface which encloses a desired angle β with a basic reference surface of a lens positioning apparatus which comprises a vacuum pipette. The ball lens was lifted by means of the said pipette at right angles with respect to the basic reference surface and was then placed in an empty tubular housing 2 the center line of which was at right angles to the basic reference surface. As a result of this the ball lens is placed in the tubular housing of the connector part at the desired angle β with respect to the center line of the tubular housing. By providing a reference surface 21 on the housing 2 it is also known how the surface 20 is inclined in the housing. The surfaces 6 and 20 can be correctly aligned with respect to each other by means of reference surface 22 on a pull relief device 23 which is connected around capillary 10 and which indicates the inclination of the end face 6 of fiber 4. The machining operation occurs in the same manner as described with reference to the connector part of FIG. 2.

We claim:

1. A ball lens connector part for use in an optical connector, which ball lens connector part comprises a tubular housing, a ball lens provided in one end of the housing and an end part of an optical fiber having a light conducting core secured in the housing, the center of the end face of the fiber core in the housing being situated substantially in the focal plane of the ball lens, the center line of the circumference of the tubular housing at the area of the end coinciding with the optical axis of the connector part, the said optical axis being defined as the center line of a parallel light beam emanating via the ball lens when the connector is used, the center of the ball lens being situated on the elongation of the center line of the fiber core, wherein the smallest angle which is formed by the normal of the end face of the fiber core and the center line of the fiber core at the area of the end part of the fiber is not equal to 0° and the end of the housing is machined so that the center line of the circumference of the end and the optical axis coincide.

2. A ball lens connector part as claimed in claim 1, wherein the smallest angle which is formed by the normal of the end face of the fiber core and the center line of the fiber core at the area of the end part of the fiber is between 7° and 12°.

3. A ball lens connector part as claimed in claim 1 or wherein a ball lens is used having a refractive index that is greater than 1.6.

4. A ball lens connector part as claimed in claim 1 wherein the ball lens has a flat surface on its side facing the end part of the fiber.

5. A ball lens connector part as claimed in claim 4, wherein the normal on the flat surface of the ball lens and the center line of the fiber core are at an angle which is between 4° and 10°.

6. A ball lens connector part as claimed in claim 1, wherein the end part of the optical fiber is secured in a tube having a capillary concentric bore, the tube being connected in the housing.

7. A method of manufacturing a ball lens connector part as claimed in claim 1, wherein an end part of an optical fiber is provided with an inclined end face, after which the said end part is secured in a tubular housing which comprises a ball lens and the ball lens connector part thus formed is positioned against an eccentric seat of a machining tool, the positioning of the connector part and the eccentricity of the seat being arranged so that the optical axis of the connector part coincides with the mechanical axis of the tool, after which the connector part is subjected to a machining treatment.

8. A method as claimed in claim 7, wherein, prior to the inclination, the end part of the optical fiber is secured in a capillary, which is provided with a reference surface indicating the direction in which the end face is inclined.

9. A ball lens connector part for use in an optical connector, which ball lens connector part comprises a tubular housing, a ball lens provided in one end of the housing and an end part of an optical fiber having a light conducting core secured in the housing, the center of the end face of the fiber core in the housing being situated substantially in the focal plane of the ball lens, the center line of the circumference of the tubular housing at the area of the end coinciding with the optical axis of the connector part, the said optical axis being defined as the center line of a parallel light beam emanating via the ball lens when the connector is used, the center of the ball lens being situated on the elongation of the center line of the fiber core, wherein the smallest angle which is formed by the normal of the end face of the fiber core and the center line of the fiber core at the area of the end part of the fiber is between 7° and 12°, the ball lens contains an antireflex coating, and the total reflections of said ball lens connector part are less than −60 dB.

10. A ball lens connector part as claimed in claim 9 wherein the angle is between 4° and 10°, the ball lens has a flat surface on its side facing the end part of the fiber, and the total reflections of the ball lens connector part are less than −80 dB.

* * * * *